United States Patent [19]

Hollar, Jr.

[11] 4,148,519

[45] Apr. 10, 1979

[54] SUNSHADE SUPPORT ASSEMBLY

[75] Inventor: Arthur W. Hollar, Jr., Grosse Pointe Woods, Mich.

[73] Assignee: General Motors Corporation, Detroit, Mich.

[21] Appl. No.: 850,615

[22] Filed: Nov. 11, 1977

[51] Int. Cl.² .............................................. B60J 3/00
[52] U.S. Cl. ............................. 296/97 H; 248/289 R
[58] Field of Search ............... 296/97 R, 97 G, 97 H; 248/289, 205

[56] References Cited

U.S. PATENT DOCUMENTS

| 3,122,393 | 2/1964 | Moody | 296/97 H |
|---|---|---|---|
| 3,334,853 | 8/1967 | Noll | 248/289 |

Primary Examiner—Philip Goodman
Attorney, Agent, or Firm—K. H. MacLean, Jr.

[57] ABSTRACT

A vehicle sunshade support assembly including a support member pivotally mounted to the vehicle body. A horizontally extending portion of the support has a bore therein and a keyway opening to the bore. The sunshade is attached to a horizontally extending rod which has a molded bushing of plastic material on an end configured to snugly be inserted into the bore and keyway. The sunshade and rod are rotatable as a unit within the bushing which is prevented from rotating by interaction between a key portion thereon and the keyway. Aligned slots in the horizontal support portion and the bushing receive a resilient retainer which holds the bushing axially in the bore.

3 Claims, 4 Drawing Figures

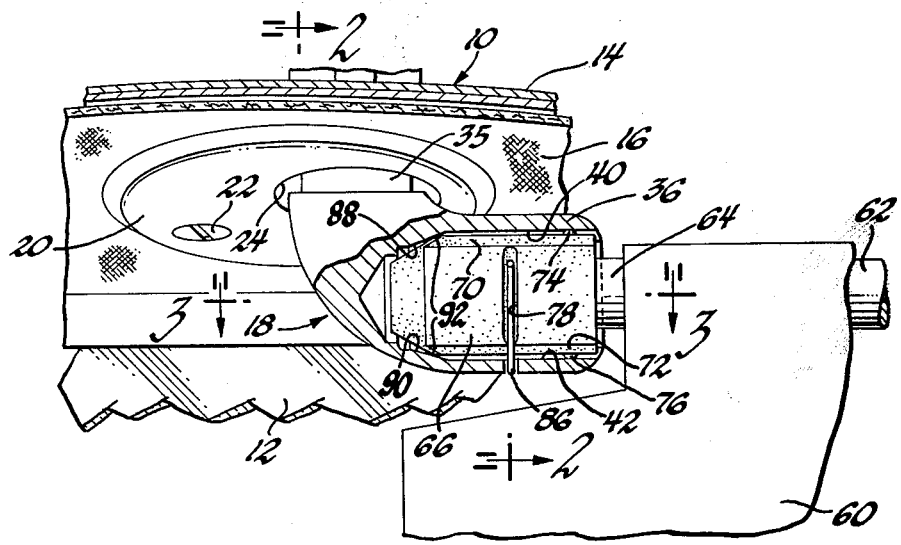
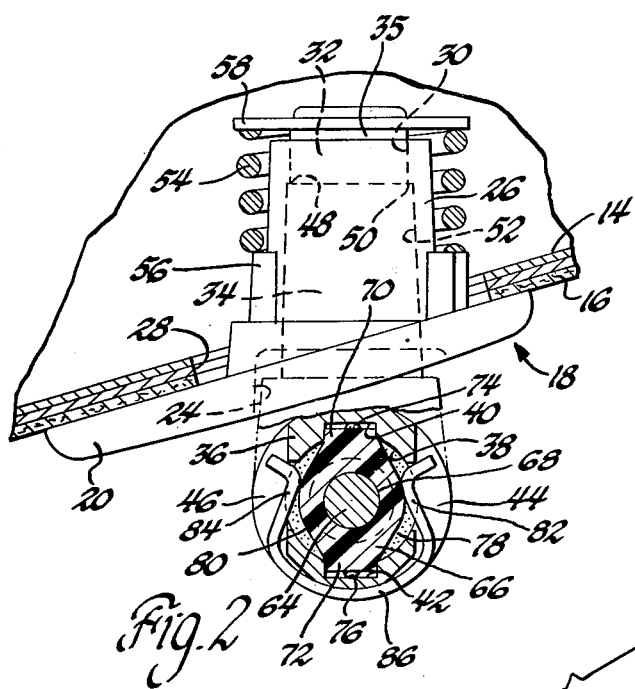
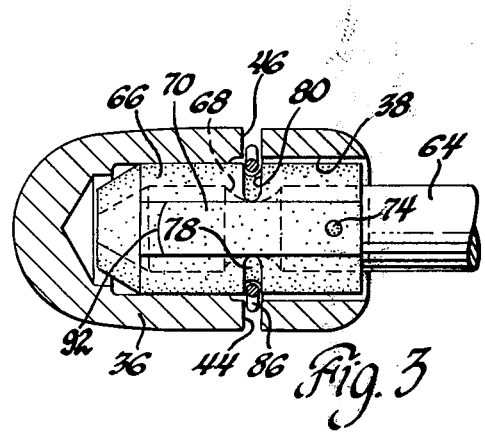
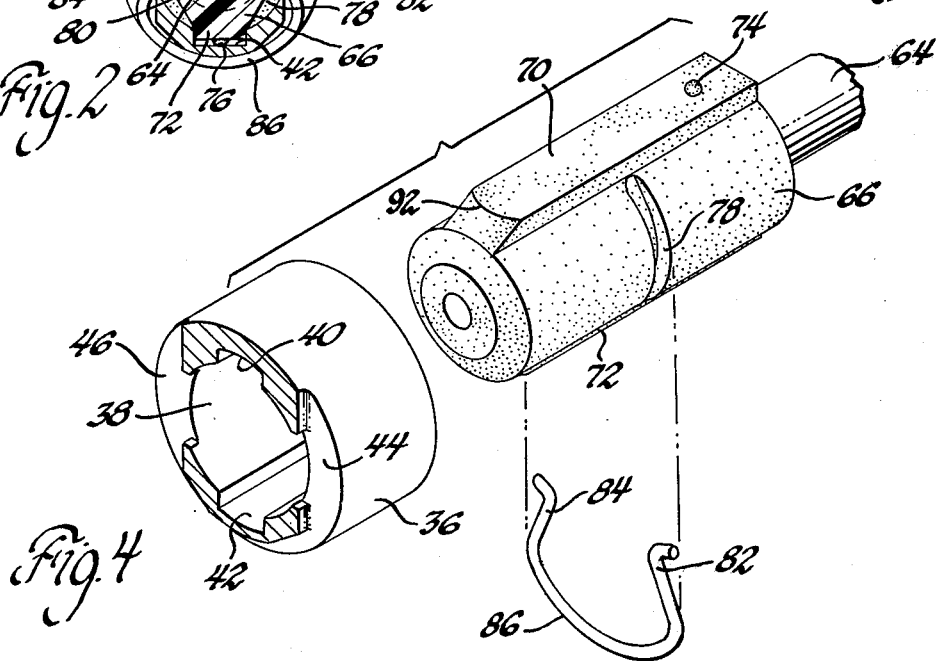

SUNSHADE SUPPORT ASSEMBLY

Many prior sunshade supports are patented. An example is the device disclosed in U.S. Pat. No. 3,334,853 to Noll. The Noll device provides a two-piece rod clamp to frictionally support the sunshade. A compression type coil spring biases the pieces against the rod in clamping relation.

The subject sunshade support includes an L-shaped support member rotative about a vertically oriented leg to permit movement of the sunshade from a windshield position to a side window position. Also a horizontally extending portion is provided for attachment to the end of a sunshade support rod and specifically a bushing thereon. The sunshade rod rotates within the bushing to provide an angular adjustment with respect to the windshield. The bushing is molded onto the end of the support rod in a subassembly operation and subsequently the bushing and rod end are inserted as a unit into an axially extending bore in the horizontal portion of the support. The bushing has a radially extending key thereon which cooperates with a keyway in the horizontal portion to prevent rotation of the bushing. Also, aligned grooves or slots in the horizontal support portion and the bushing receive the legs of a U-shaped retainer to axially secure the bushing and support rod.

The bushing on the end of the support rod is molded thereabout and a slight groove in the rod prevents axial movement of the bushing. The bushing is annealed in mineral oil at a predetermined temperature and time after molding which eliminates brittleness of the plastic material and is found to have a beneficial effect on the stability of the resultant torque characteristics between the bushing and the end of the support rod. The support rod is rotatable within the bushing and the frictional torque force necessary to rotate the support rod is obviously a function of design and molding specifications as well as operating temperatures. It has been found that the aforementioned annealing step decreases the spread or range of torque forces in any one batch of parts and of course this narrowed range is desirable.

Other advantages and features of the subject sunshade support assembly will be more readily apparent from a reading of the following detailed description, reference being had to the acompanying drawings in which a preferred embodiment is illustrated.

In the drawings:

FIG. 1 is a fragmentary elevational view partially in section of the sunshade support assembly;

FIG. 2 is a sectioned view taken along sectional line 2—2 in FIG. 1 and looking in the direction of the arrows;

FIG. 3 is a sectioned view taken along sectional line 3—3 in FIG. 1 and looking in the direction of the arrows; and FIG. 4 is a perspective exploded view of a portion of the support member as well as the bushing and the support rod end.

Referring particularly to FIG. 1 of the drawing, a vehicle body is generally designated by the numeral 10 and also shown is a windshield 12, the upper end of which is mounted in the body header structure 14 which is concealed from the interior of the vehicle by headlining 16.

A sunshade support assembly 18 according to this invention includes an annular escutcheon or mounting member 20 which is bolted at 22 to the header structure 14 through the headlining 16. As seen in FIG. 2, the mounting member 20 is shaped to conform to the header 14 and includes an annular recess 24 and a tubular portion 26 which extends through opening 28 in the header structure 14. Portion 26 includes a reduced diameter portion 30 which snugly encircles a reduced diameter portion 32 of a sunshade support member 34. The sunshade support member 34 has an L-shaped configuration and includes vertically oriented leg portion 35 with the reduced diameter end 32 a part thereof and a horizontally oriented leg portion 36. As best shown in FIG. 4, the horizontally oriented portion of the support member 36 has an axially extending opening or bore 38 therein and a pair of keyways 40, 42. As illustrated in FIGS. 3 and 4, a pair of slots 44, 46 are also formed in the horizontal portion 36 of the support member.

The support member 18 is axially located within the tubular portion 26 by engagement between a shoulder 48 formed on the vertically oriented portion 35 and the shoulder portion 50 located between the larger diameter tapered opening 52 and the smaller diameter opening 30. One end of a coil spring 54 in compression engages a stepped portion 56 on the tubular portion 26 and engages at the opposite end a retainer member 58 attached to the vertical portion 35. This attachment of the vertical portion 35 to portion 26 of member 20 permits rotation of the sunshade support about the axis of the vertical portion 35 when the sunshade is moved from the windshield position to the side window position.

Referring back to FIG. 1, the sunshade 60 itself is of conventional configuration, and only a corner portion of it is shown. The sunshade 60 has a channel formed along its upper edge through which a rod support 62 extends. The sunshade 60 and rod 62 are grippingly engaged to one another to restrict relative rotation therebetween. Referring again to FIGS. 3 and 4, it can be seen that end portion 64 of the rod 62 has a molded plastic bushing 66 thereon which encircles the rod end. A shallow groove 68 in the rod positively prevents axial movement of the bushing on the rod. The bushing 66 has a pair of ridges or keys 70, 72 adapted to enter and engage the keyways 40 and 42, respectively, when the bushing 66 is inserted into bore 38. Keys 70 and 72 have small radially outwardly raised portions 74, 76 which, after insertion of the bushing in bore 38 a certain extent, engage the bushing 36 to tightly hold bushing 66 with respect to radial movement therein.

The bushing 66 has a pair of semi-circular grooves or slots 78 and 80 extending circumferentially partway thereabout which receive opposite leg portions 82, 84 of a U-shaped retainer member 86. The member 86 is inserted through the slots 44, 46 in the horizontal portion 36 of the support member when the leg portions 82 and 84 readily engage the slots 78, 80 when the bushing is inserted to be aligned with the slots 44, 46. This prevents removal of the bushing 66 and rod 62 from the bore 38 without pulling the retainer 86.

The sunshade 60 and support rod 62 are pivoted together to adjust the angle of the sunshade with respect to windshield. This causes end portion 64 of the rod 62 to rotate within the plastic bushing 66 which is held in a stationary position by the interaction of keys 70, 72 within keyways 40, 42. The bushing 66 is mold formed from acetal resin. The resultant combination of the rod and bushing forms a frictional contact or bearing therebetween to permit the rod to rotate within the bushing in response to an external application of a torque load. The torque needed to rotate end 64 in bushing 66 is a function of design of the bushing and rod and also the operating temperatures. The torque remains substantially constant throughout the life of the sunshade within these parameters. It has been found that by annealing the acetal bushing and the rod end in mineral oil at about 310° F for 30 minutes, brittleness of the plastic is eliminated and the torque necessary to rotate the rod is stabilized to a more constant value for a given batch of parts. Without the anneal operation, the torque values are spread over a wider range, although they still may be satisfactory for sunshade support purposes.

Reference has been made to the raised portions 74 on the key portions 70, 72 to maintain a tight fit with the bushing keyways 40, 42. Portions 74 are shown at the rightward end in FIG. 4. To provide a tight fit at the other end, a similar provision may be made but preferably a tight fit is formed by providing ramp portions 88, 90 integral with the member 36 as shown in FIG. 1. Ramps 88, 90 engage the edge 92 of the bushing 66 as the bushing is established within aperture 38.

The general arrangement of the sunshade support and the provision of the keys 40, 42, the raised portions 74, 76 and ramps 88, 90 greatly enhance the utility of the support by providing ease of assembly and disassembly by simple removal of retainer 86.

Although only one embodiment has been illustrated, modifications of the sunshade support assembly may be accomplished without falling outside the scope of the following claims which define the invention.

What is claimed is:

1. A pivotal support assembly for a vehicle sunshade, comprising: support means for the sunshade including a vertically oriented portion operably attached to the vehicle, another portion of the support means having a substantially horizontally oriented bore formed therein, first slot means in said another support portion opening to said bore, a support means rod attached to the sunshade and having an end portion, a bushing member mold formed on the rod end portion permitting relative rotation therebetween, means between said rod end portion and bushing preventing axial movement therebetween, said bushing with the rod end portion therein extending into said bore to mount the sunshade, means between the another support means portion and the bushing member preventing relative rotation therebetween, second slot means in said bushing member aligned with said first slot means when the bushing member is fully inserted in said bore, and retainer means including a leg portion extending into said aligned slot means to axially hold the bushing member in said bore.

2. A pivotal support assembly for a vehicle sunshade, comprising: support means for the sunshade including a vertically oriented portion operably attached to the vehicle, another portion of the support means having a substantially horizontally oriented bore formed therein, first slot means in said another support means portion opening to said bore, a support means rod attached to the sunshade and having an end portion, a bushing member mold formed on the rod end portion to permit relative rotation therebetween, said bushing member being subsequently annealed in relatively warm mineral oil to provide for substantial constant torque requirements to initiate rotation between said bushing member and rod end portion among parts of the same design and material and at essentially constant temperature, means between said rod end portion and bushing preventing axial movement therebetween, said bushing with the rod end portion therein extending into said bore to mount the sunshade, means between the another support means portion and the bushing member preventing relative rotation therebetween, a second slot means in said bushing member aligned with said first slot means when the bushing member is fully inserted in said bore, and retainer means including a leg portion extending into said aligned slot means to axially hold the bushing member in said bore.

3. A pivotal support assembly for a vehicle sunshade, comprising: support means for the sunshade including a vertically oriented portion operably attached to the vehicle, another portion of the support means having a substantially horizontally oriented bore formed therein and a keyway opening to the bore defining a more radially outward surface than the remainder of the bore, first slot means in said another support means portion opening to said bore, a support rod attached to the sunshade and having an end portion, a bushing member mold formed on the rod end portion permitting relative rotation therebetween, and a radially outwardly projecting key formed therewith adapted to extend into said keyway of said bore to prevent relative rotation between said another support means portion and said bushing after insertion of said bushing in said bore, means including a raised portion on said key and adapted to resiliently press against said radially outward surface of said keyway to provide a snug fit between the bushing member and the another support means portion particularly in the radial direction, second slot means in said bushing member aligned with said first slot means when the bushing member is fully inserted in said bore, and retainer means including a leg portion extending into said aligned slot means to axially hold the bushing member in said bore.

* * * * *